US011894633B2

(12) United States Patent
Ikeya et al.

(10) Patent No.: US 11,894,633 B2
(45) Date of Patent: Feb. 6, 2024

(54) CONNECTOR UNIT

(71) Applicant: Yazaki Corporation, Tokyo (JP)

(72) Inventors: Kazuhide Ikeya, Makinohara (JP); Koutaro Tobino, Fujieda (JP); Yoshizumi Sakurai, Fujieda (JP)

(73) Assignee: Yazaki Corporation, Tokyo (JP)

( * ) Notice: Subject to any disclaimer, the term of this patent is extended or adjusted under 35 U.S.C. 154(b) by 138 days.

(21) Appl. No.: 17/699,599

(22) Filed: Mar. 21, 2022

(65) Prior Publication Data

US 2022/0311176 A1 Sep. 29, 2022

(30) Foreign Application Priority Data

Mar. 24, 2021 (JP) ................................ 2021-050052

(51) Int. Cl.
*H01R 13/52* (2006.01)

(52) U.S. Cl.
CPC ................................ *H01R 13/5219* (2013.01)

(58) Field of Classification Search
None
See application file for complete search history.

(56) References Cited

U.S. PATENT DOCUMENTS 6,045,383 A 4/2000 Fujiwara
6,354,852 B2 * 3/2002 Noro ................ H01R 13/62938 439/157
9,337,571 B2 * 5/2016 Furuya ............... H01R 13/5219
11,133,620 B2 9/2021 Ishikawa et al.
2005/0003690 A1 1/2005 Fukamachi
2017/0062969 A1 3/2017 Kida
2020/0303860 A1 9/2020 Ikeya et al.

FOREIGN PATENT DOCUMENTS

EP 3751676 A1 12/2020
JP H09-306585 A 11/1997
JP 2004-311190 A 11/2004
JP 2006-185875 A 7/2006
JP 2015-041508 A 3/2015
JP 2020035550 A * 3/2020 ............. H01R 13/15
JP 2020-155222 A 9/2020

* cited by examiner

*Primary Examiner* — Tho D Ta
(74) *Attorney, Agent, or Firm* — Banner & Witcoff, Ltd.

(57) ABSTRACT

A connector unit includes a first connector, a second connector and a seal member to be interposed therebetween. The first connector includes a fitting portion having a distal end portion. The second connector includes a fitted portion. A thickness of the fitting portion is reduced at the distal end portion with an inner peripheral surface of the distal end portion being recessed. The fitted portion includes an attachment portion to which the seal member is to be attached and a housing portion. When the first connector and the second connector are fitted to each other, the distal end portion is accommodated in the housing portion, and the seal member performs sealing between the fitting portion and the fitted portion by being sandwiched between the attachment portion and a portion of the fitting portion, the portion being provided further in a second direction than the distal end portion.

3 Claims, 16 Drawing Sheets

CONNECTOR UNIT

CROSS-REFERENCE TO RELATED APPLICATION

The present application claims priority to Japanese Patent Application No. 2021-050052 filed on Mar. 24, 2021, the entire content of which is incorporated herein by reference.

TECHNICAL FIELD

The presently disclosed subject matter relates to a connector unit including a first connector and a second connector that are configured to be fitted to each other, and a seal member configured to be interposed between the first connector and the second connector.

BACKGROUND

A related art connector unit has a waterproof function. For example, a connector unit in the related art is provided with a ring-shaped packing between a fitting portion of one connector and a fitted portion of the other connector. When both connectors are fitted to each other, intrusion of water through a gap between the fitting portion and the fitted portion is prevented by the packing (for example, see JP2004-311190A).

When the above-described connector unit in the related art is actually used, in addition to an external force in a direction (that is, a radial direction) in which an annular packing is pressed by the fitting portion and the fitted portion in order to achieve a sealing property which the packing is expected to achieve, an external force in a fitting direction due to relative movement between the fitting portion and the fitted portion is also exerted on the annular packing. In particular, when a thickness of the packing is increased for the purpose of improving a sealing performance, the latter external force (that is, the external force in the fitting direction) tends to increase. When the latter external force becomes excessively large, the packing may be bitten due to a positional deviation of the packing or the like, or the packing itself may be damaged due to this biting. The positional deviation, the damage, or the like of the packing should be reduced as much as possible since the positional deviation, the damage, or the like may hinder the packing from exhibiting its expected sealing property. On the other hand, if the thickness of the packing is excessively reduced for the purpose of reducing the latter external force (that is, external force in the fitting direction), the expected sealing performance required for the packing may be impaired. As described above, it is generally difficult to achieve both the good sealing performance between the connectors and the reduction of the positional deviation of the seal member when the connectors are fitted to each other.

SUMMARY

Illustrative aspects of the presently disclosed subject matter provide connector unit capable of achieving both a good sealing performance between connectors and reduction of a positional deviation of a seal member when the connectors using the seal member are fitted to each other.

According to an illustrative aspect of the presently disclosed subject matter, a connector unit includes a first connector and a second connector configured to be fitted to each other and a seal member configured to, when the first connector and the second connector are fitted to each other, be interposed between the first connector and the second connector. The first connector includes a fitting portion extending in a first direction in which the first connector is fitted to the second connector, the fitting portion having a distal end portion in the first direction. The second connector includes a fitted portion configured such that the fitting portion is fitted to the fitted portion. A thickness of the fitting portion is reduced at the distal end portion with an inner peripheral surface of the distal end portion being recessed toward an outer side in a radial direction of the connector unit. The fitted portion includes an attachment portion configured such that the seal member is attached to the attachment portion and a housing portion provided further in the first direction than the attachment portion. When the first connector and the second connector are fitted to each other, the distal end portion is accommodated in the housing portion, and the seal member performs sealing between the fitting portion and the fitted portion by being sandwiched between the attachment portion and a portion of the fitting portion, the portion being provided further in a second direction opposite to the first direction than the distal end portion.

Other aspects and advantages of the presently disclosed subject matter will be apparent from the following description, the drawings and the claims.

DESCRIPTION OF EMBODIMENTS

Hereinafter, a connector unit 100 according to an embodiment of the presently disclosed subject matter will be described with reference to the drawings. As shown in FIG.

7A and in some other figures, the connector unit 100 includes a first connector 1 and a second connector 2 that are to be fitted to each other.

Hereinafter, for convenience of description, as shown in FIGS. 1 to 11B, a "fitting direction", a "width direction", an "upper-lower direction", "upper", and "lower" are defined. The "fitting direction", the "width direction", and the "upper-lower direction" are perpendicular to one another. The fitting direction coincides with a moving direction of the first connector 1 and the second connector 2 when the first connector 1 and the second connector 2 are fitted to each other. In each of the first connector 1 and the second connector 2, a front side along the fitting direction to which the mating connector is fitted is defined as a front side, and a back side opposite to the front side along the fitting direction is defined as a rear side. Also, a direction along the fitting direction in which the first connector 1 moves to be fitted to the second connector 2 is defined as a first direction (left direction in FIG. 5A) and another direction opposite to the first direction is defined as a second direction (right direction in FIG. 5A). Hereinafter, members forming the connector unit 100 will be described in order.

Figure 1:
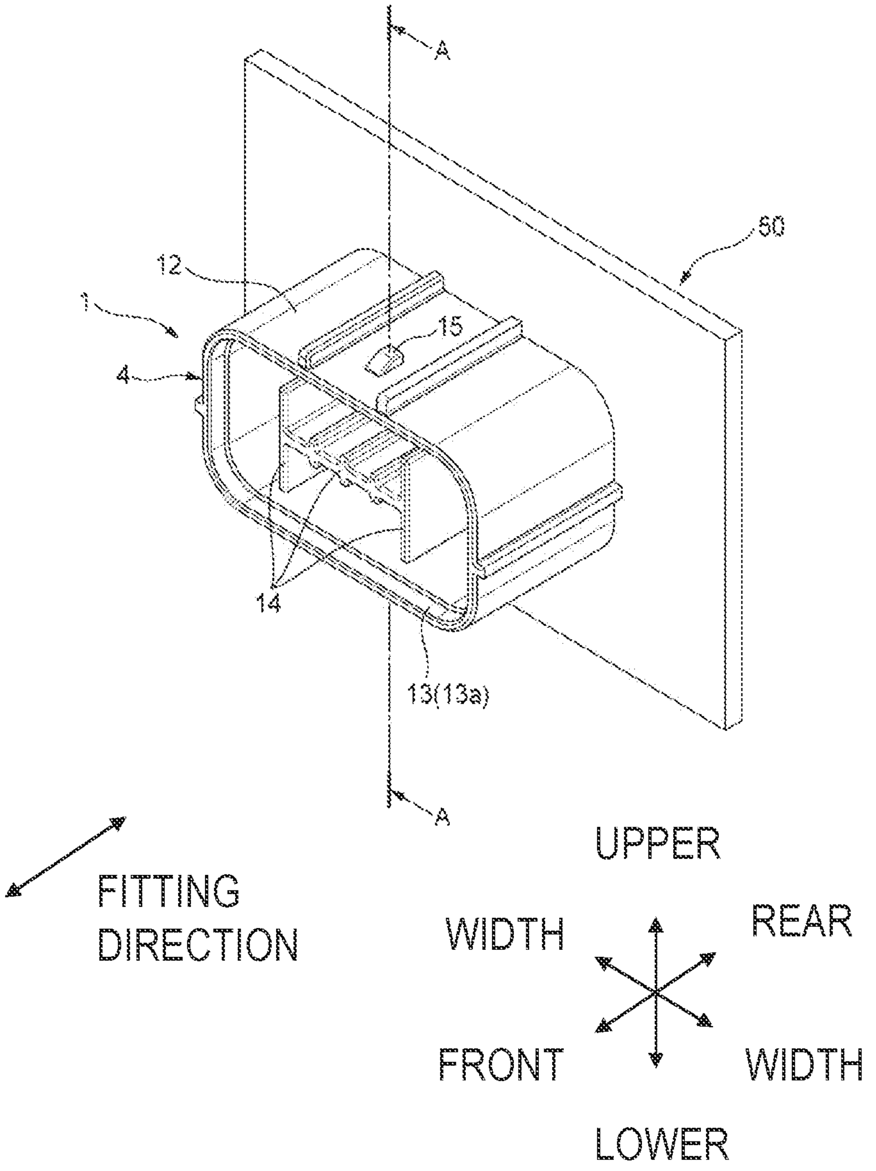
FIG. 1 is a perspective view showing a first connector forming a connector unit according to an embodiment of the presently disclosed subject matter.
Figure 2:
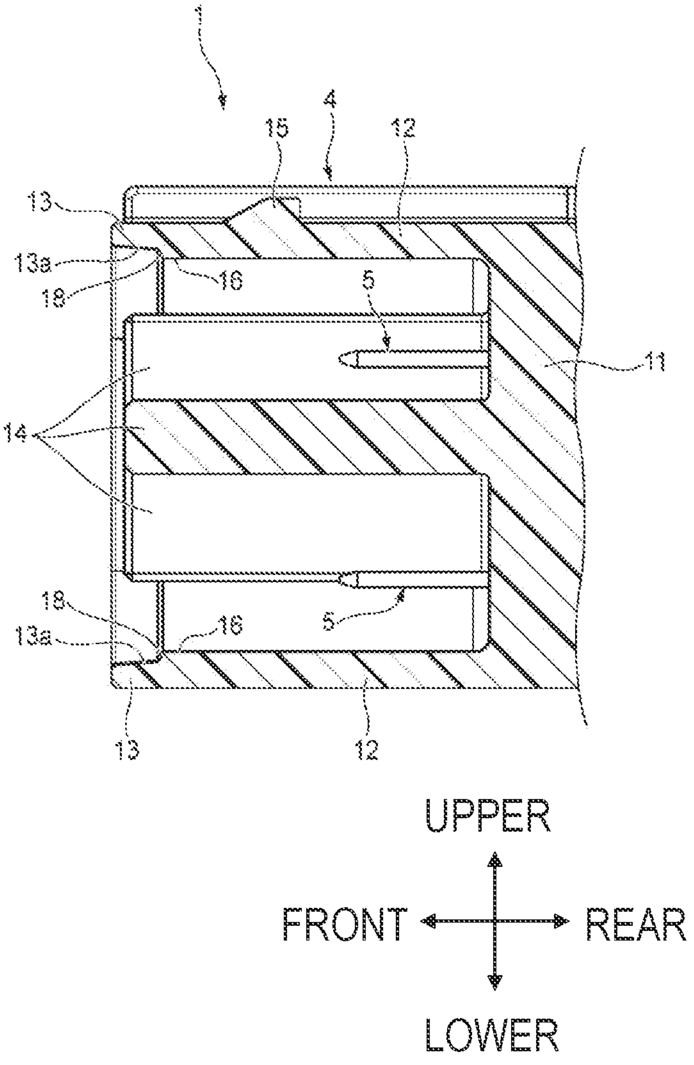
FIG. 2 is a cross-sectional view taken along a line A-A in FIG. 1.

First, the first connector 1 will be described. As shown in FIG. 1, the first connector 1 forms a part of a housing 50 of a device to be mounted on a vehicle. The first connector 1 is to be fitted to the second connector 2 (see FIGS. 7A and 7B), so that the first connector 1 conductively connects a plurality of electric wires 10 (see FIGS. 3 and 7A) connected to the second connector 2 to a predetermined circuit in the device. As shown in FIGS. 1 and 2, the first connector 1 includes a male housing 4 and a plurality of male terminals 5 housed in the male housing 4.

As shown in FIGS. 1 and 2, the male housing 4 forms a part of the housing 50, and is a resin molded body integrally including a main body portion 11 and a hood portion 12. The main body portion 11 has a flat plate shape extending in the width direction and the upper-lower direction (see FIG. 2). The hood portion 12 has a substantially rectangular tubular shape that protrudes forward from the main body portion 11 and that opens forward (see FIG. 1).

The plurality of rod-shaped metal male terminals 5 extending in the front-rear direction are fixed to the main body portion 11 while protruding forward from the main body portion 11 in an internal space of the hood portion 12 (see FIG. 2). In this example, the plurality of male terminals 5 arranged along the width direction are arranged into two upper and lower rows and extend forward from the main body portion 11 (see FIGS. 10 and 11A). Therefore, in this example, when the first connector 1 and the second connector 2 are fitted to each other, the electric wires 10 in each of the two upper and lower rows are electrically connected to the male terminals 5 provided in a corresponding one of the two upper and lower rows.

A front end portion of the hood portion 12 having a substantially rectangular tubular shape forms an extended distal end portion 13 (distal end portion 13) having a shape reduced in thickness such that an inner peripheral surface thereof is recessed radially outward (see FIGS. 1 and 2). The inner peripheral surface 13*a* of the extended distal end portion 13 is tapered such that an inner diameter of the hood portion 12 becomes greater toward a distal end of the hood portion 12 (toward a distal end of the extended distal end portion 13). A substantially rectangular tubular portion (a portion not reduced in thickness) adjacent to a rear side of the extended distal end portion 13 in the hood portion 12 forms a packing contact portion 16, which is to, when the first connector 1 and the second connector 2 are fitted to each other (see FIGS. 2, 7A, and 7B), be in contact with an outer periphery of a packing 7 (see FIG. 3 and the like). An inner peripheral surface of the packing contact portion 16 is a surface parallel to the fitting direction. A smooth stepped portion 18 is formed on an inner peripheral surface of a boundary portion between the extended distal end portion 13 and the packing contact portion 16 (see FIG. 2).

A guide rib 14 having a substantially H shape as viewed from the front is provided in the main body portion 11 while protruding forward from the main body portion 11 in the internal space of the hood portion 12. When the first connector 1 and the second connector 2 are fitted to each other, the guide rib 14 guides the first connector 1 by being inserted into a guide groove 33 (see FIG. 3 or the like) of the second connector 2 such that the first connector 1 moves along a front-rear direction relative to the second connector 2.

A lock beak 15 is provided at a center of an upper wall of the hood portion 12 in the width direction while protruding upward. In a state in which the first connector 1 and the second connector 2 are fitted to each other (see FIG. 7A), the lock beak 15 maintains the first connector 1 and the second connector 2 in a fitted state by being engaged with an engagement portion 31 (see FIG. 4 and the like) of a lock portion 28 of the second connector 2. The first connector 1 has been described as above.

Figure 3:
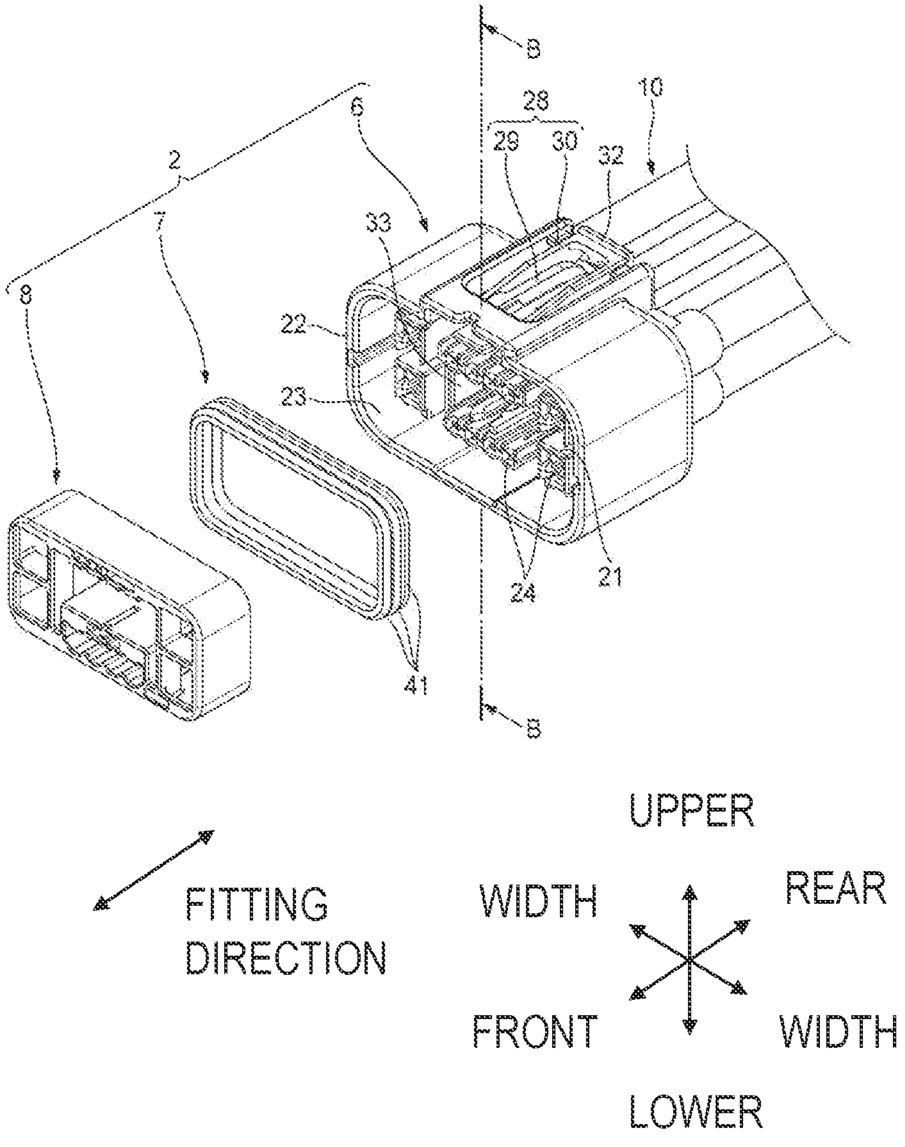
FIG. 3 is an exploded perspective view showing a second connector forming the connector unit according to the embodiment of the presently disclosed subject matter.

Next, the second connector 2 will be described. As shown in FIG. 3, the second connector 2 includes a female housing 6, the packing 7 to be mounted on the female housing 6, a front holder 8 to be mounted on the female housing 6, and a plurality of female terminals 9 (see FIGS. 10 and 11A) housed in the female housing 6. Each of the female terminals 9 is connected to a terminal of a corresponding one of the electric wires 10.

Figure 4:
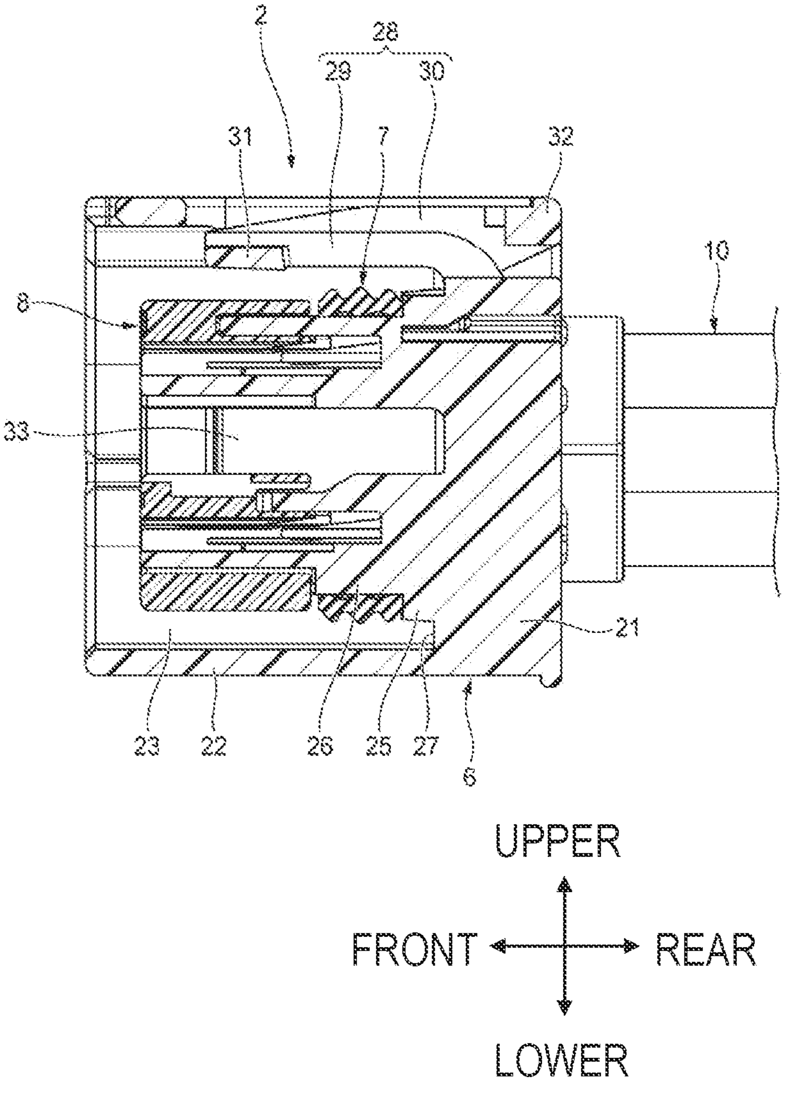
FIG. 4 is a view corresponding to a B-B cross section of the second connector in FIG. 3.

As shown in FIG. 4, the female housing 6 is a resin molded body integrally including a main body portion 21 and a hood portion 22. As shown in FIGS. 3 and 4, the main body portion 21 has a substantially rectangular parallelepiped shape extending in the front-rear direction. The hood portion 22 has a substantially rectangular tubular shape that extends forward covering an outer periphery of the main body portion 21 from a rear end portion of the outer periphery of the main body portion 21 and that opens forward. A substantially rectangular tubular annular gap 23 is defined between an outer peripheral surface of the main body portion 21 and an inner peripheral surface of the hood portion 22 (see FIG. 3). When the first connector 1 and the second connector 2 are fitted to each other, the hood portion 12 of the first connector 1 is inserted into the annular gap 23 (see FIGS. 5A and 5B).

Figure 10:
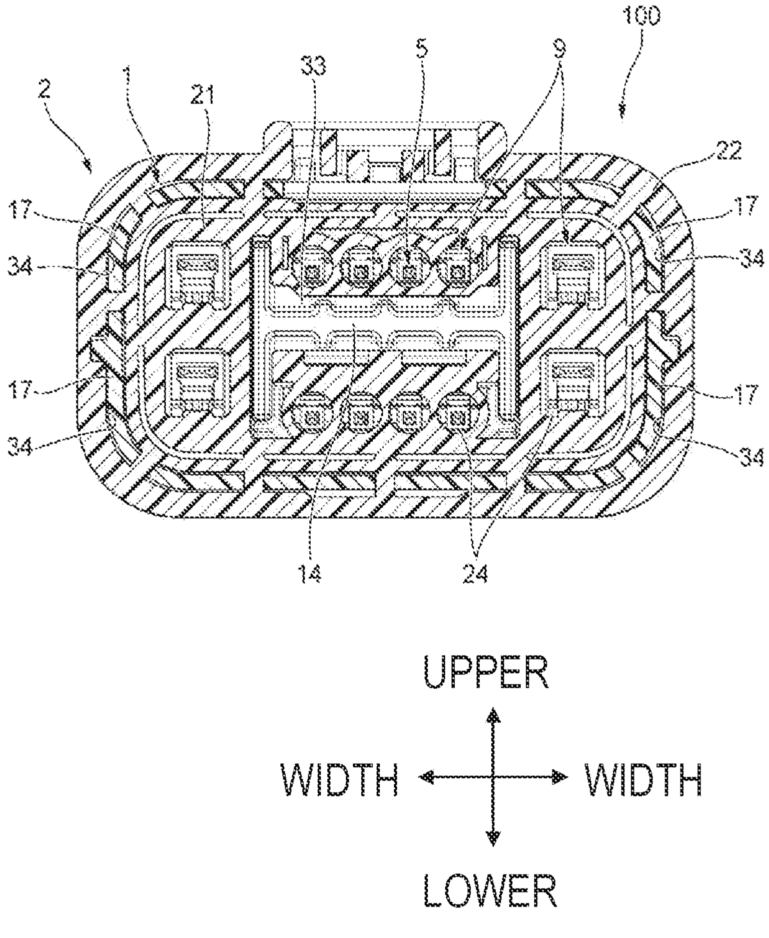
FIG. 10 is a cross-sectional view taken along a line G-G in FIG. 9A.
Figure 11A:
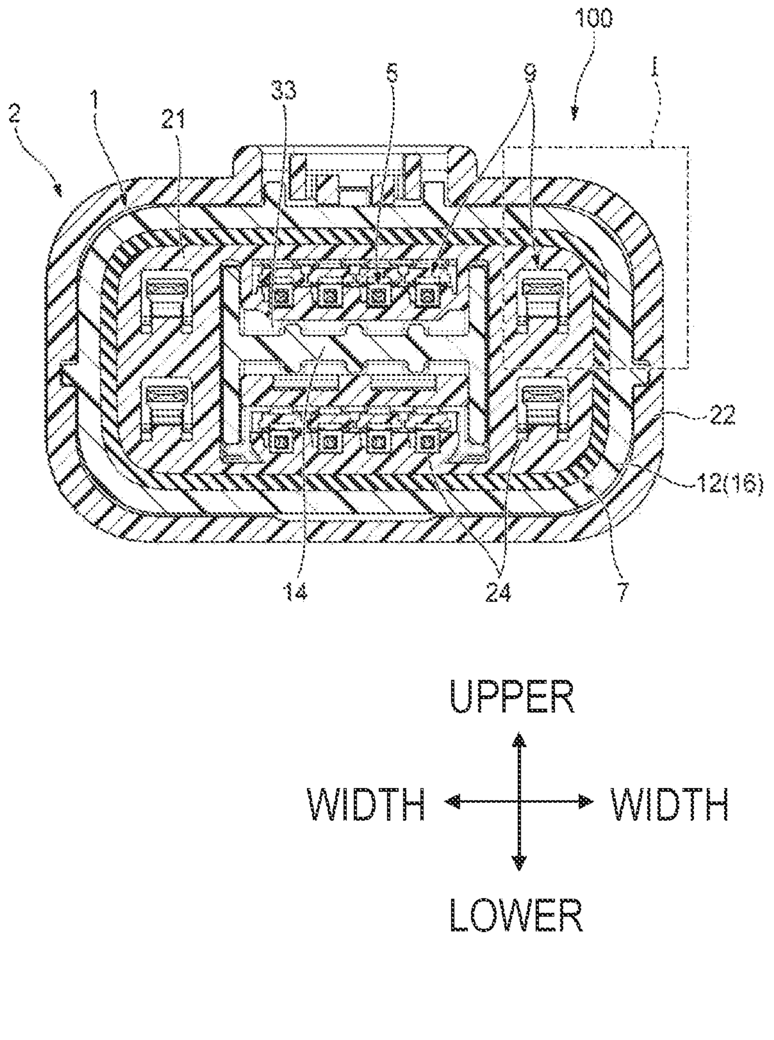
FIG. 11A is a cross-sectional view taken along a line H-H in FIG. 9A.
Figure 11B:
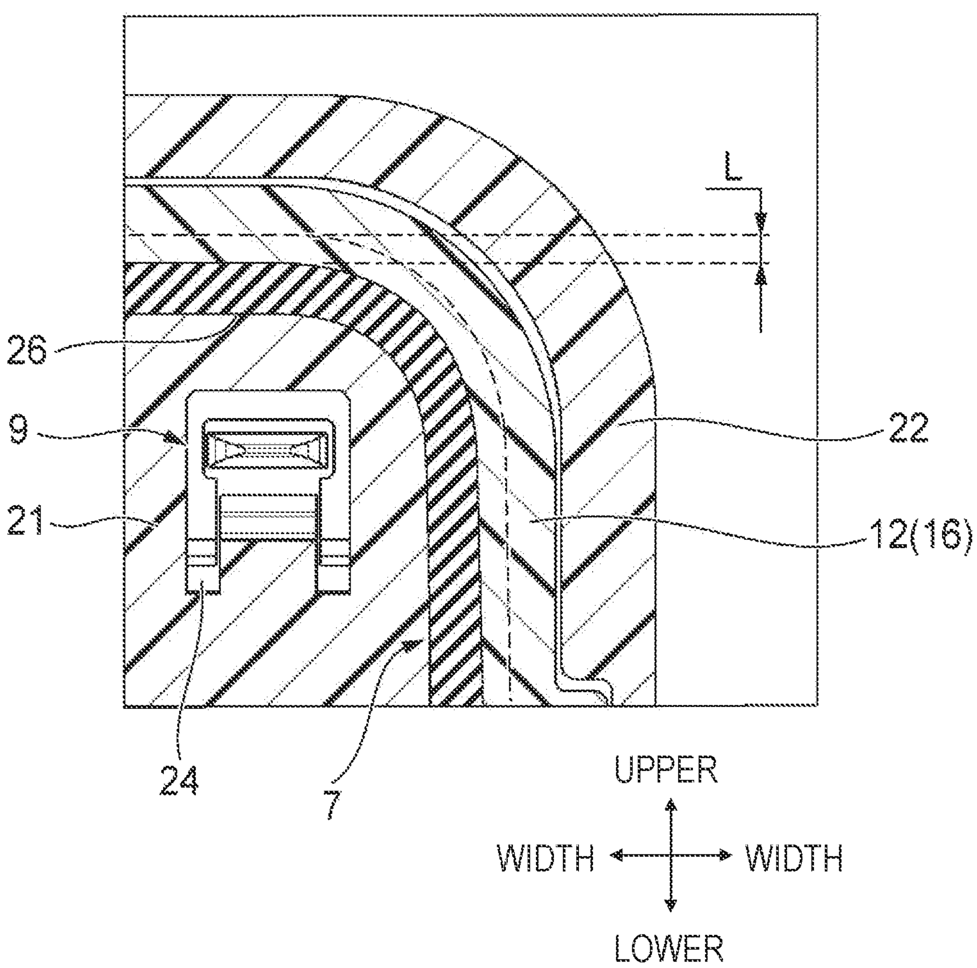
FIG. 11B is an enlarged view showing a part I in FIG. 11A.

Inside the main body portion 21, a plurality of terminal accommodation chambers 24 arranged in the width direction in each of two upper and lower rows extend in the front-rear direction (see FIGS. 3, 10, and 11A). The female terminal 9 provided at a terminal of the electric wire 10 is inserted from a rear side of the plurality of terminal accommodation chambers 24 and accommodated in each of the plurality of terminal accommodation chambers 24. In the main body portion 21, the guide groove 33 having a substantially H shape as viewed from the front is provided corresponding to the guide rib 14 of the first connector 1 while being recessed rearward and opening forward.

A substantially rectangular step portion 25 protruding radially outward is formed on an outer peripheral surface of the main body portion 21 in the vicinity of a connection portion between the main body portion 21 and the hood portion 22. A rectangular annular portion adjacent to a front side of the step portion 25 on the outer peripheral surface of the main body portion 21 functions as a packing attachment portion 26 to which the packing 7 is to be mounted (see FIG. 4 and the like). A front-end surface of the step portion 25 functions as a locking surface for the packing 7 mounted on the packing attachment portion 26 (see FIG. 4 and the like).

A housing portion 27 is defined by a radially outer surface of the step portion 25 and the inner peripheral surface of the hood portion 22. The housing portion 27 is a substantially rectangular annular recess that is recessed rearward and that opens forward. When the first connector 1 and the second connector 2 are fitted to each other, the extended distal end portion 13 of the first connector 1 is inserted into the housing portion 27.

As shown in FIG. 3, a central portion of an upper wall of the hood portion 22 in the width direction protrudes upward over an entire region in the front-rear direction, and the lock portion 28 is exposed to an outside at a notch portion formed in a rear region of this protruding portion.

As shown in FIGS. 3 and 4, the lock portion 28 includes a pair of cantilever-shaped lock arms 29 extending forward from the rear end portion of the upper wall of the main body portion 21, each of the pair being away from each other in the width direction, and a pair of cantilever-shaped operation arms 30 extending rearward from front end portions of the pair of lock arms 29, each of the pair being away from each other in the width direction. Both the pair of lock arms 29 and the pair of operation arms 30 are elastically deformable in the upper-lower direction. Front end portions of the pair of lock arms 29 are connected to each other in the width direction by the engagement portion 31, and rear end portions of the pair of operation arms 30 are connected to each other in the width direction by an operation unit 32.

Figure 7A:
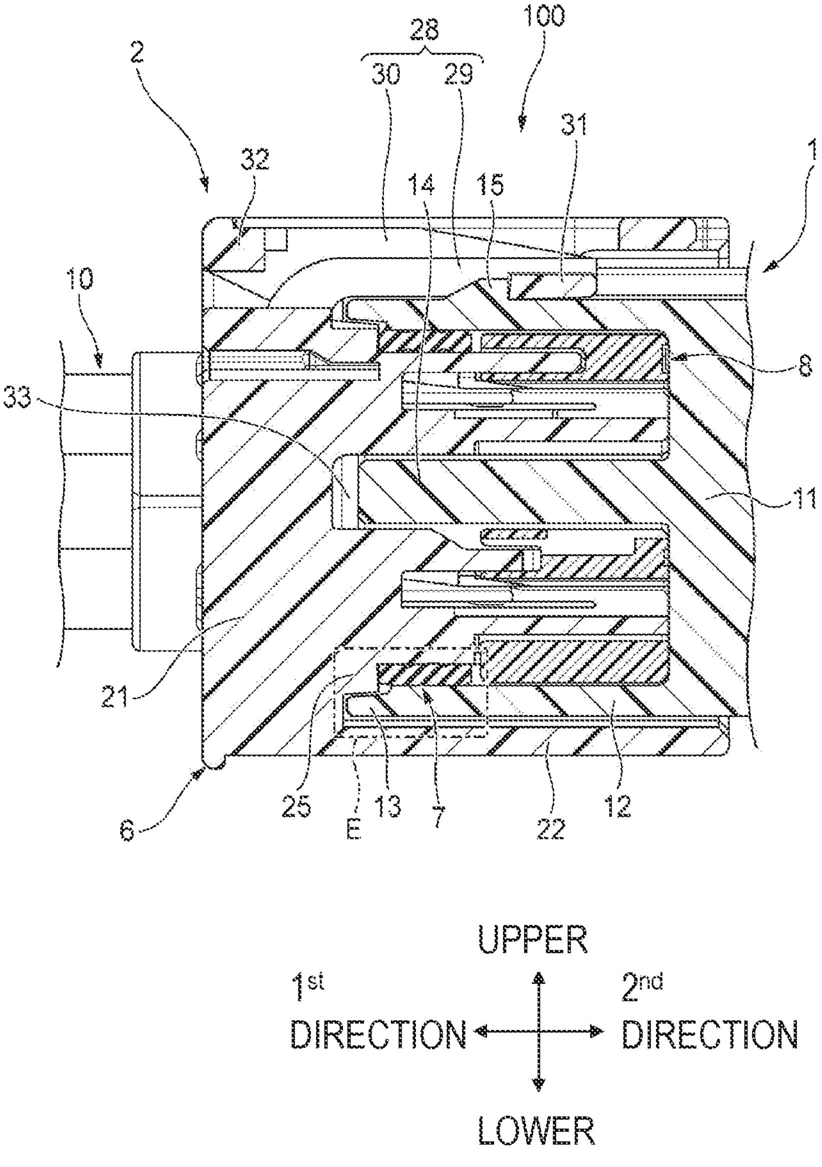
FIG. 7A is a cross sectional view corresponding to FIGS. 5A and 5B and shows a completion stage of the fitting between the first connector and the second connector.
Figure 7B:
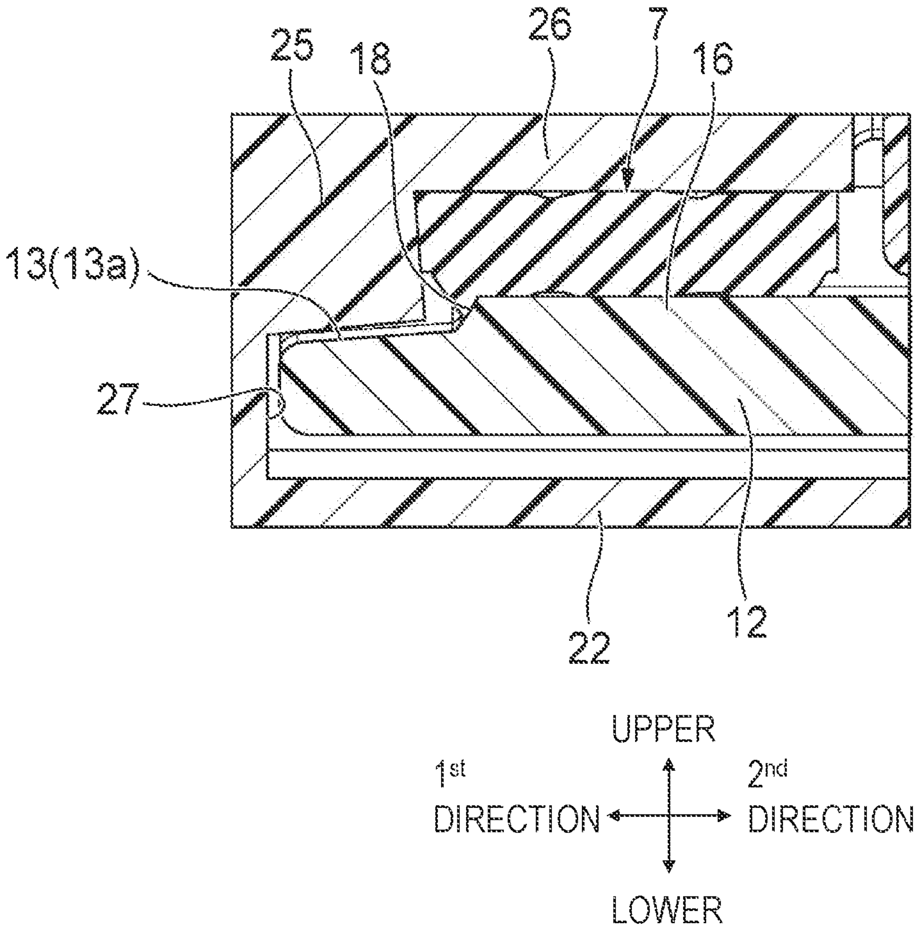
FIG. 7B is an enlarged view showing a part E in FIG. 7A.
Figure 8:
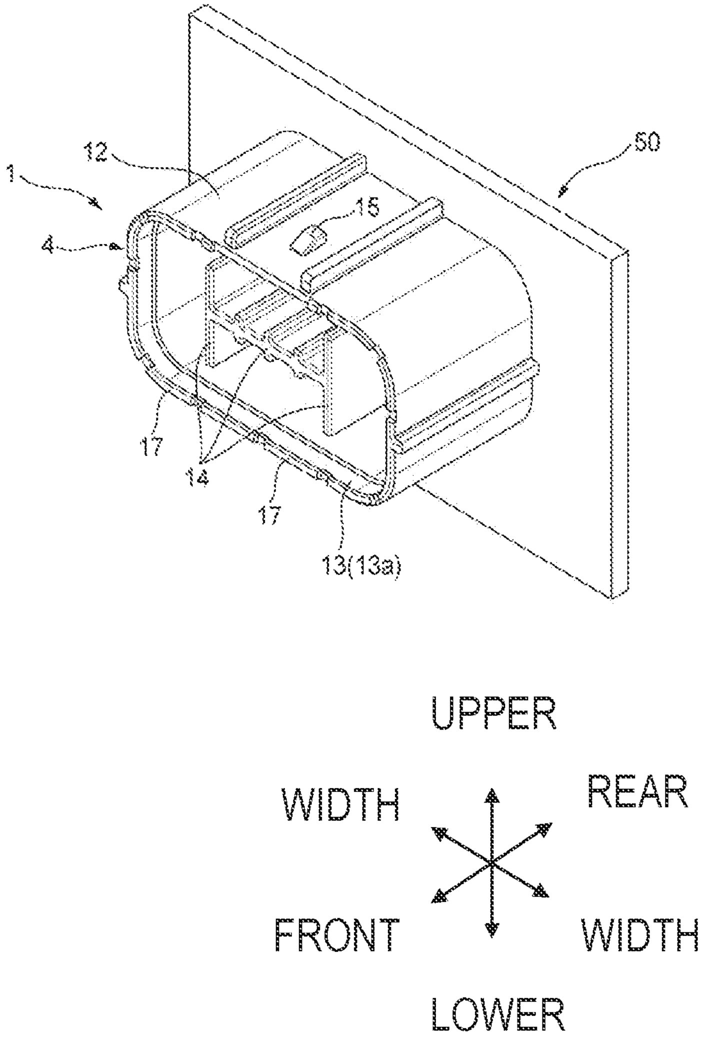
FIG. 8 is a perspective view showing a first connector forming a connector unit according to a modification.

The packing 7 is a seal member formed of rubber having a substantially rectangular tubular shape, and has a sealing function of preventing intrusion of water through the annular gap 23 between the hood portion 12 (the packing contact portion 16) of the first connector 1 and the main body portion 21 (the packing attachment portion 26) of the second connector 2 in the fitted state of the first connector 1 and the second connector 2 (see FIGS. 7A and 7B). As shown in FIG. 3 and the like, three annular lip portions 41 protruding radially outward are arranged on the outer peripheral surface of the packing 7 along the front-rear direction. As shown in FIG. 4, the packing 7 is inserted into the annular gap 23 from the front, and is attached to the packing attachment portion 26 of the main body portion 21 such that the packing 7 abuts against the front-end surface of the step portion 25. In a state in which the packing 7 is attached to the packing attachment portion 26, top portions of the three lip portions 41 are located slightly radially outward from the radially outer surface of the step portion 25.

The front holder 8 is a resin molded product having a shape that can be attached to the front-end portion of the main body portion 21, and is attached to the front-end portion of the main body portion 21 to which the packing 7 has already been attached as shown in FIG. 4 and the like. In a state of being attached to the front-end portion of the main body portion 21, the front holder 8 has a so-called double locking function of preventing the female terminal 9 from coming off to the rear, an incomplete insertion detection function of detecting incomplete insertion of the female terminal 9, and a packing falling prevention function of preventing the packing 7 from falling forward. The second connector 2 has been described above.

Figure 5A:
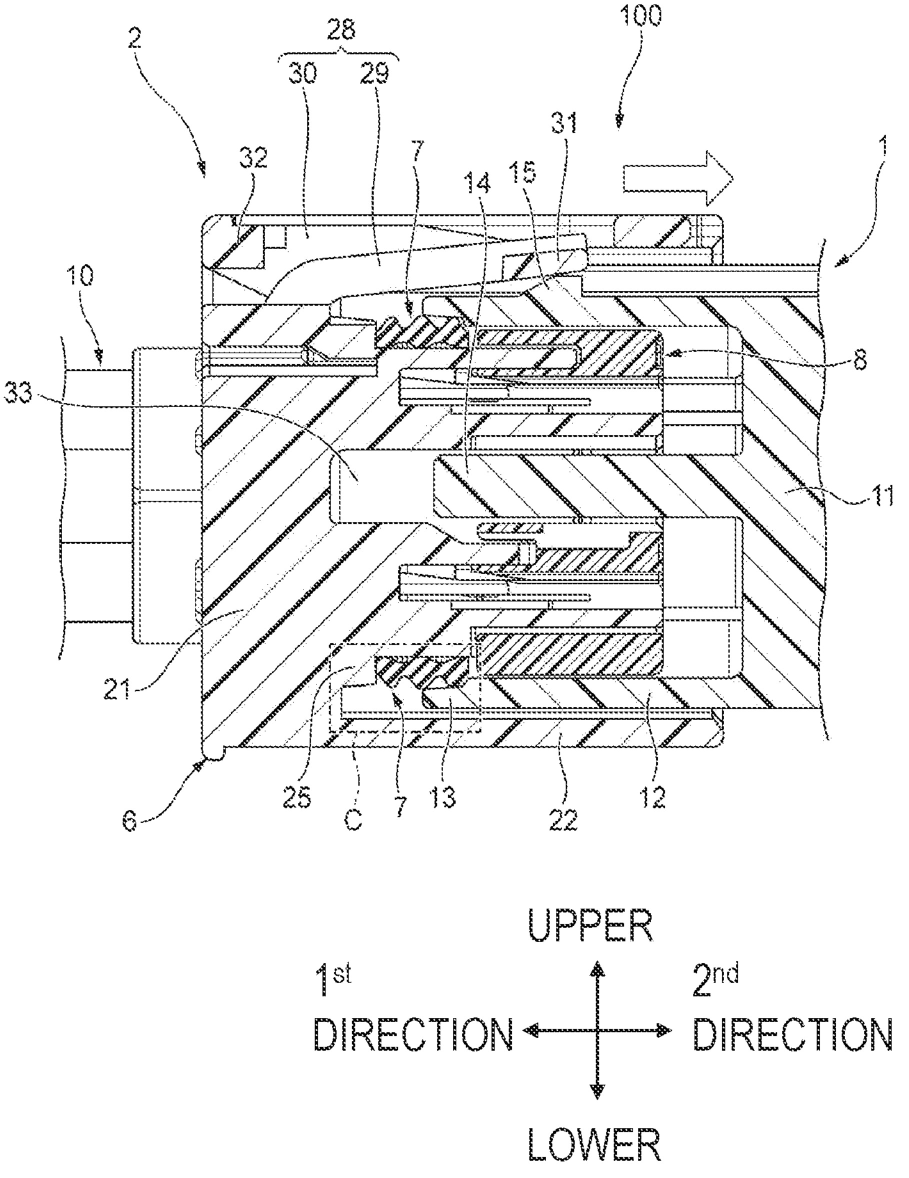
FIG. 5A is a cross sectional view corresponding to FIG. 4 and shows a first stage during fitting between the first connector and the second connector.
Figure 5B:
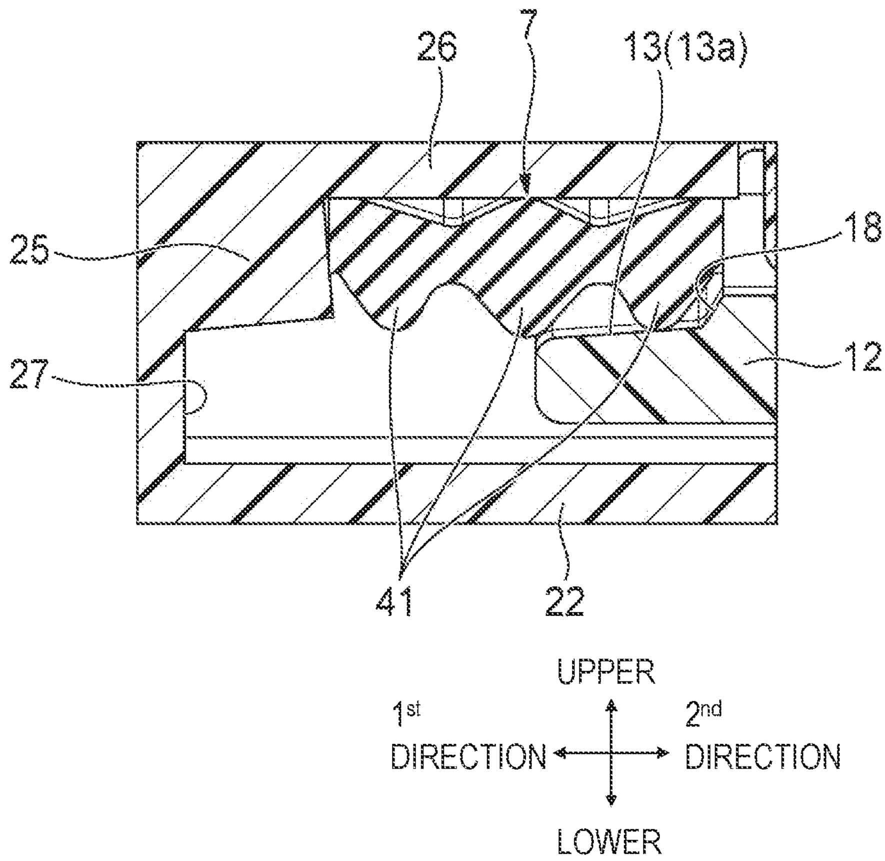
FIG. 5B is an enlarged view showing a part C in FIG. 5A.

Next, a fitting process of the first connector 1 and the second connector 2 will be described. In order to fit the first connector 1 and the second connector 2 to each other, as shown in FIGS. 5A and 5B, the housing 4 and the housing 6 are brought close to each other in the fitting direction such that the hood portion 12 is inserted into the annular gap 23, the plurality of male terminals 5 are inserted into the plurality of female terminals 9, and the guide rib 14 is inserted into the guide groove 33. At this time, when the guide rib 14 is inserted into the guide groove 33, the first connector 1 is guided so as to move relative to the second connector 2 along the front-rear direction. Therefore, the fitting process can proceed smoothly.

As the fitting process proceeds, when the lock beak 15 pushes the engagement portion 31 of the lock portion 28 upward and the pair of lock arms 29 elastically deform upward, as shown in FIGS. 5A and 5B, the lip portions 41 of the packing 7 are slightly pressed by the inner peripheral surface 13*a* of the extended distal end portion 13 of the hood portion 12 and rubbed against the inner peripheral surface 13*a*. As described above, since the inner peripheral surface 13*a* of the extended distal end portion 13 is a tapered surface, the inner peripheral surface 13*a*, not a front-end portion of the hood portion 12, contacts the lip portion 41 of the packing 7.

As described above, in an initial stage in which the lip portion 41 of the packing 7 abuts against the hood portion 12, the extended distal end portion 13 having a shape reduced in thickness with the inner peripheral surface 13*a* recessed radially outward rubs against the lip portion 41. Therefore, a frictional force due to slide between the extended distal end portion 13 and the lip portion 41 (that is, the packing 7) in the fitting direction can be reduced as compared with a mode in which this reduction in thickness is not provided. Therefore, for example, even when the thickness (the thickness in a radial direction) of the packing 7 is increased for the purpose of improving the sealing property, it is possible to prevent the packing 7 from being bitten or buckled due to the external force applied to the packing 7 by the front-end portion of the hood portion 12.

Figure 6A:
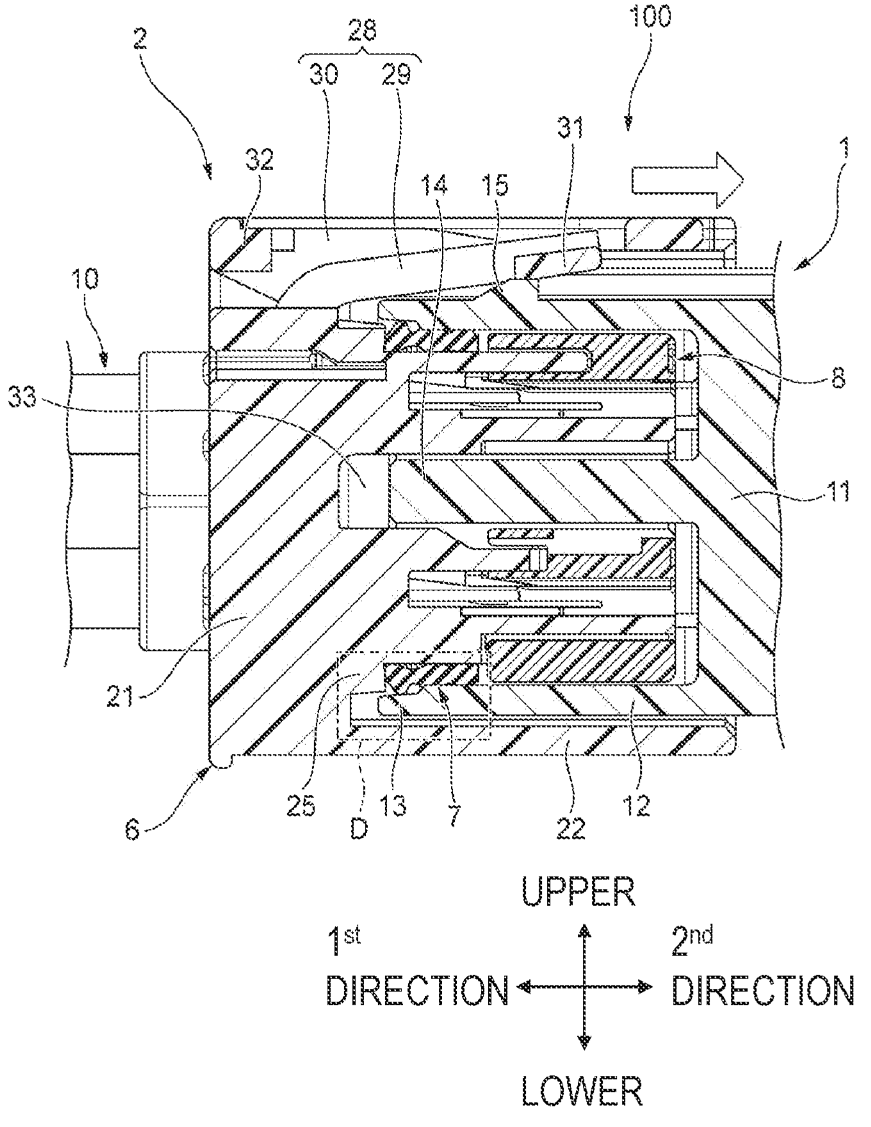
FIG. 6A is a cross sectional view corresponding to FIGS. 5A and 5B and shows a second stage during the fitting between the first connector and the second connector.
Figure 6B:
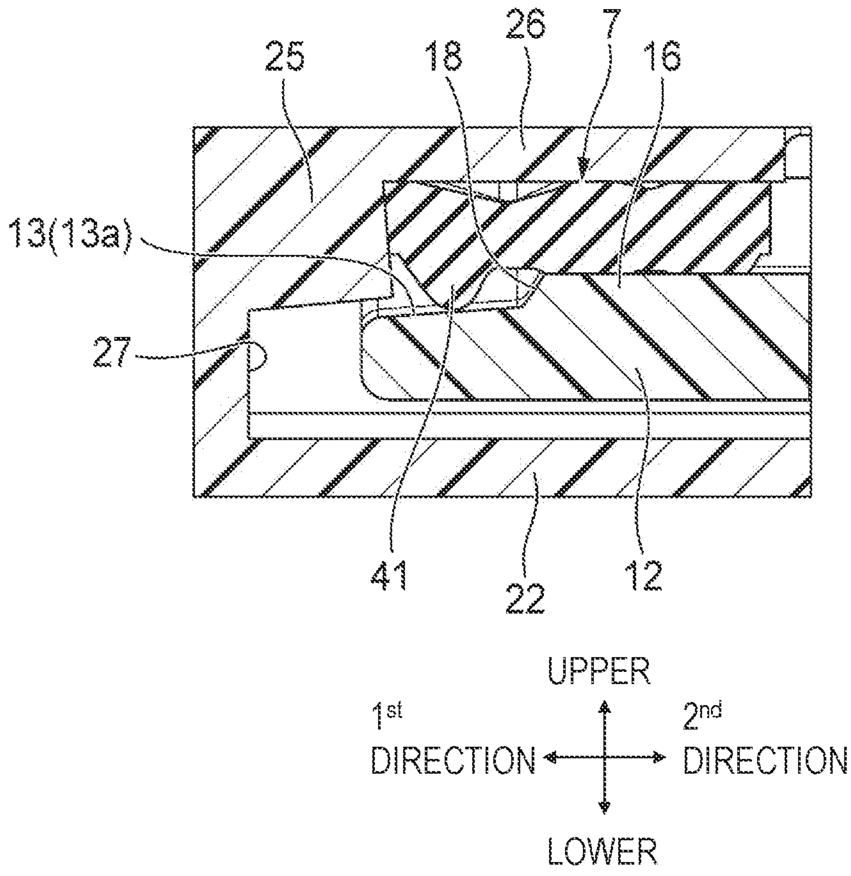
FIG. 6B is an enlarged view showing a part D in FIG. 6A.

When the fitting process further proceeds from this stage, as shown in FIGS. 6A and 6B, the lip portions 41 of the packing 7 go over the stepped portion 18, thereby being pressed further, and rub against the inner peripheral surface of the packing contact portion 16.

When the fitting process further proceeds from this stage, as shown in FIGS. 7A and 7B, the lock beak 15 goes over the engagement portion 31, thereby elastically returning the pair of lock arms 29 downward, and the lock beak 15 and the engagement portion 31 are engaged with each other in the front-rear direction. Accordingly, the fitting between the first connector 1 and the second connector 2 is completed, and the connector unit 100 is obtained.

In a state in which the fitting between the first connector 1 and the second connector 2 is completed (hereinafter, simply referred to as a "fitting completed state"), the lock beak 15 and the engagement portion 31 are engaged with each other in the front-rear direction (see FIG. 7A), so that the fitting completed state is maintained (the first connector 1 and the second connector 2 are prevented from being separated from each other in the front-rear direction).

Further, in the fitting completed state, all of the three lip portions 41 of the packing 7 are pressed in the radial direction over an entire circumference at an appropriate pressing amount L (see FIG. 11B) between the packing attachment portion 26 and the packing contact portion 16 (see FIG. 7B). Accordingly, the annular gap 23 between the hood portion 12 (the packing contact portion 16) and the main body portion 21 (the packing attachment portion 26) is sealed in a watertight manner.

Further, in the fitting completed state, the plurality of male terminals 5 of the first connector 1 and the plurality of female terminals 9 of the second connector 2 are electrically connected. Accordingly, the four electric wires 10 in each of the two upper and lower rows are electrically connected to each other via the four male terminals 5 provided in a corresponding one of the two upper and lower rows.

Further, in the fitting completed state, as shown in FIG. 7B, the extended distal end portion 13 is inserted into the housing portion 27. Therefore, as compared with a case in which the extended distal end portion 13 simply abuts against the wall surface or the like of the main body portion 21, it is possible to lengthen an intrusion path (a so-called creeping distance) of water or the like that enter a space between the hood portion 12 and the hood portion 22 and between the hood portion 12 and the main body portion 21.

In order to separate the first connector 1 and the second connector 2 from the fitting completed state, the operation unit 32 of the lock portion 28 is pushed down. Accordingly, the pair of operation arms 30 bend downward, so that the pair of lock arms 29 bend upward. As a result, the engagement portion 31 moves upward, and the engagement between the engagement portion 31 and the lock beak 15 is released. In this state, the first connector 1 and the second connector 2 are separated from each other by applying an external force in a direction in which the first connector 1 and the second connector 2 are separated from each other along the fitting direction.

As described above, according to the connector unit 100 in the present embodiment, in the initial stage of the fitting process of the first connector 1 and the second connector 2, the extended distal end portion 13 of the hood portion 12 of the first connector 1 is reduced in thickness in a direction away from the packing 7. Therefore, the sliding frictional force generated between the extended distal end portion 13 and the packing 7 can be reduced as compared with the case in which this reduction in thickness is not provided. Further, when the fitting process proceeds, the packing 7 is sandwiched between the packing contact portion 16 on a base (rear) end side with respect to the extended distal end portion 13 of the first connector 1 and the packing attachment portion 26 of the second connector 2, and seals the gap between the first connector 1 and the second connector 2. Therefore, for example, even when the thickness of the packing 7 is increased for the purpose of improving the sealing property, the packing 7 is prevented from being abnormally deformed (that is, being bitten, buckled, or the like) due to the external force applied to the packing 7 by the front-end portion of the hood portion 12. In addition, the extended distal end portion 13 of the hood portion 12 is to be housed in the housing portion 27. Accordingly, as compared with the case in which the extended distal end portion 13 simply abuts against the wall surface or the like of the main body portion 21, it is possible to lengthen the intrusion path (the so-called creeping distance) of water or the like that enter a space between the hood portion 12 and the hood portion 22 and between the hood portion 12 and the main body portion 21. Therefore, the connector unit 100 according to the present embodiment can achieve both the good sealing performance of the packing 7 and the prevention of the positional deviation of the packing 7 when the connectors using the packing 7 are fitted to each other.

The presently disclosed subject matter is not limited to the above-described embodiment, and various modifications can be used within the scope of the presently disclosed subject matter. For example, the presently disclosed subject matter is not limited to the above-described embodiment, and can be modified, improved, and the like as appropriate. In addition, materials, shapes, dimensions, numbers, arrangement positions, and the like of components in the above-described embodiment are freely set and are not limited as long as the presently disclosed subject matter can be achieved.

Figure 9A:
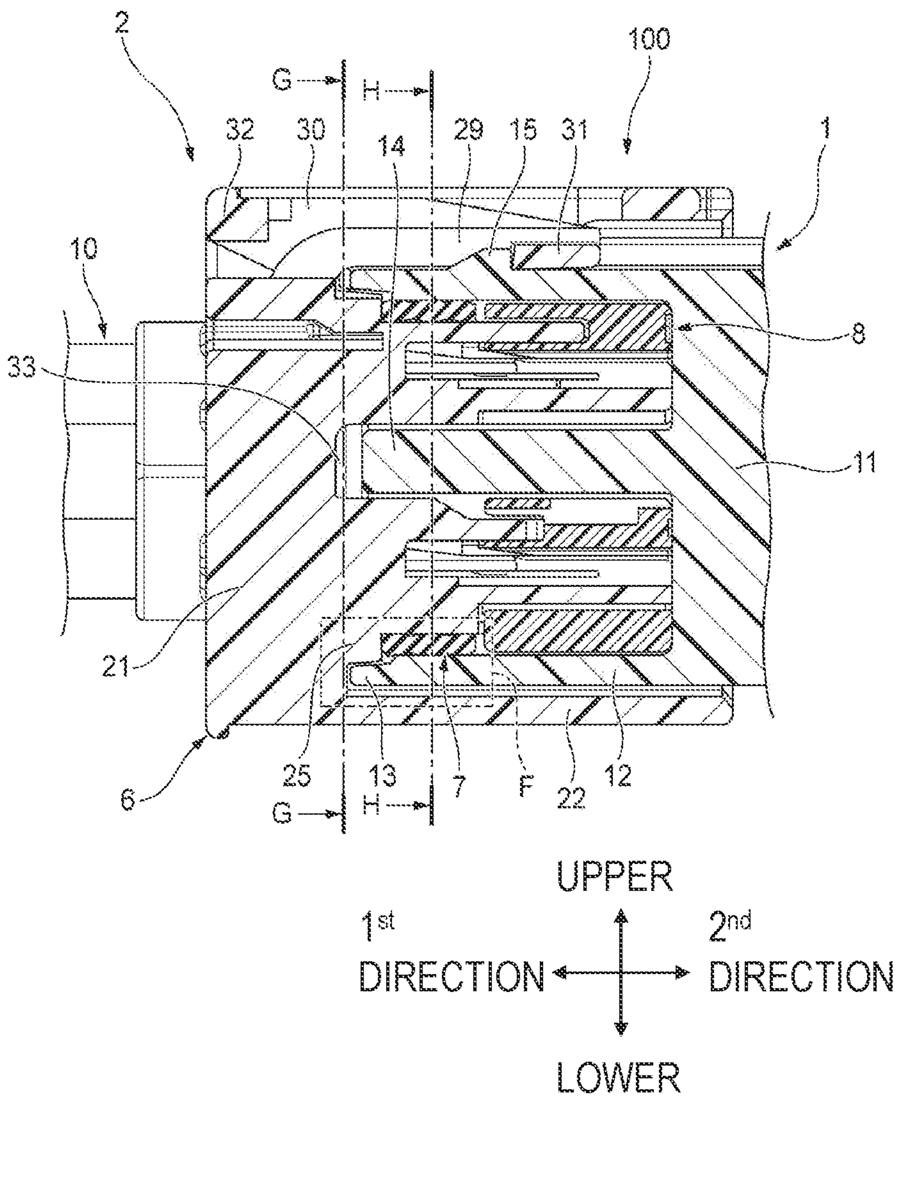
FIG. 9A is a cross-sectional view corresponding to FIG. 7A in the modification shown in FIG. 8.
Figure 9B:
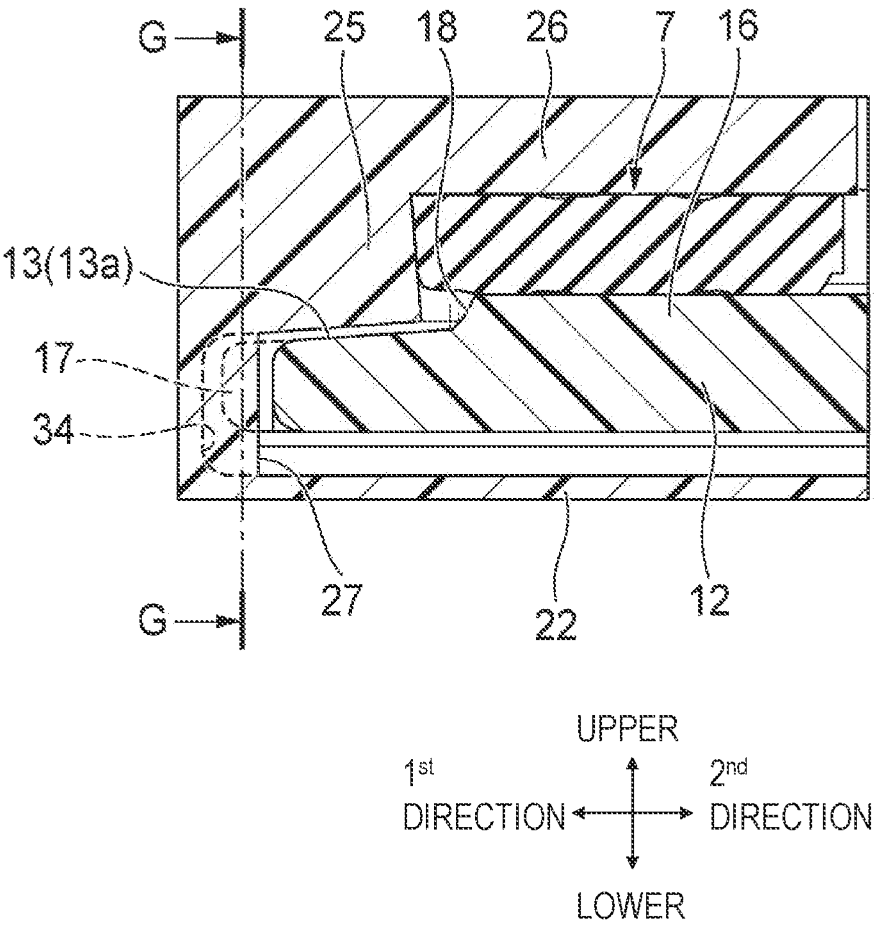
FIG. 9B is an enlarged view showing a part F in FIG. 9A.

In the above-described embodiment, a front end of the extended distal end portion 13 of the first connector 1 is not formed with irregularities over an entire circumference in a circumferential direction, and a bottom surface (a rear end surface) of the housing portion 27 of the second connector 2 is not formed with irregularities over an entire circumference in the circumferential direction. On the other hand, as shown in FIGS. 8 to 11B, a plurality of protruding portions 17 protruding forward may be provided at intervals in the circumferential direction at the front end of the extended distal end portion 13 of the first connector 1 (see FIGS. 8 and 10), and a plurality of recesses 34 recessed rearward corresponding to the plurality of protruding portions 17 may be formed at intervals in the circumferential direction at the bottom surface of the housing portion 27 of the second connector 2 (FIGS. 9B and 10).

In an example shown in FIGS. 8 to 11B, in the fitting completed state, the plurality of protruding portions 17 are inserted into the plurality of recesses 34 (FIGS. 9B and 10), and protruding surfaces of the protruding portions 17 (surfaces of the protruding portions 17) and groove inner surfaces of the recesses 34 (inner surfaces of the recesses 34) that face each other in the circumferential direction abut against each other. Therefore, in the fitting completed state, relative movement (so-called looseness) between the first connector 1 (the male housing 4) and the second connector 2 (the female housing 6) in the directions (the upper-lower direction and the width direction) intersecting the fitting direction is prevented. Accordingly, it is possible to prevent deterioration of the sealing performance due to fluctuation of the pressing amount L (see FIG. 11B) of the packing 7 caused by this looseness.

Further, in the above-described embodiment, the inner peripheral surface 13*a* of the extended distal end portion 13 is in contact with the lip portion 41 of the packing 7 during the fitting of the first connector 1 and the second connector 2 (see FIG. 5B). On the other hand, the extended distal end portion 13 may have a reduced thickness such that the inner peripheral surface 13*a* of the extended distal end portion 13 does not come into contact with the lip portion 41 of the packing 7 during the fitting of the first connector 1 and the second connector 2. Accordingly, it is possible to more effectively prevent the positional deviation of the packing 7.

According to an aspect of the embodiments described above, a connector unit (100) includes a first connector (1) and a second connector (2) configured to be fitted to each other and a seal member (7) configured to, when the first connector (1) and the second connector (2) are fitted to each other, be interposed between the first connector (1) and the second connector (2). The first connector (1) includes a fitting portion (12) extending in a first direction in which the first connector (1) is fitted to the second connector (2), the fitting portion (12) having a distal end portion (13) in the first direction. The second connector (2) includes a fitted portion (6) configured such that the fitting portion (12) is fitted to the fitted portion (6). A thickness of the fitting portion (12) is reduced at the distal end portion (13) with an inner peripheral surface (13*a*) of the distal end portion (13) being recessed toward an outer side in a radial direction of the connector unit (100). The fitted portion (6) includes an attachment portion (26) configured such that the seal member (7) is attached to the attachment portion (26) and a housing portion (27) provided further in the first direction than the attachment portion (26). When the first connector (1) and the second connector (2) are fitted to each other, the distal end portion (13) is accommodated in the housing portion (27), and the seal member (7) performs sealing between the fitting portion (12) and the fitted portion (6) by being sandwiched between the attachment portion (26) and a portion (16) of the fitting portion (12), the portion (16) being provided further in a second direction opposite to the first direction than the distal end portion (13).

According to the connector unit having the above-described configuration, since the extended distal end portion of the fitting portion of the first connector is reduced in thickness in the direction away from the seal member, the sliding frictional force generated between the extended distal end portion and the seal member can be reduced at the initial stage of the fitting process of the first connector and the second connector, as compared with the case in which this reduction in thickness is not applied. Thereafter, when the fitting process proceeds, the seal member is sandwiched between the portion of the first connector on the base end side with respect to the extended distal end portion and the attachment portion of the second connector. That is, the seal member seals the gap between the first connector and the second connector. Therefore, as described above, the positional deviation of the seal member due to the external force in the fitting direction applied on the seal member by the fitting portion (in particular, a periphery of the distal end of the fitting portion) is reduced as compared with the case in which the extended distal end portion of the fitting portion is not reduced in thickness. In addition, the extended distal end portion of the fitting portion is housed in the housing portion of the fitted portion. Accordingly, as compared with a case in which the extended distal end portion simply abuts against the wall surface or the like of the fitted portion, it is possible to lengthen the intrusion path (the so-called creeping distance) of water or the like that enter a space between the fitting portion and the fitted portion. As a result, it is possible to improve the sealing performance between the first connector and the second connector while reducing the positional deviation of the seal member. Therefore, the connector unit having the present configuration can achieve both the sealing performance between the connectors and the reduction of the positional deviation of the seal member when the connectors using the seal member are fitted to each other.

The distal end portion (13) may include a protruding portion (17) protruding in the first direction. The housing portion (27) may include a recess (34) recessed toward the first direction. When the first connector (1) and the second connector (2) are fitted to each other, the protruding portion (17) is accommodated in the recess (34), and a surface of the protruding portion (17) and an inner surface of the recess (34) abut against each other in a direction intersecting the first and second directions.

With this configuration, the extended distal end portion of the fitting portion of the first connector is provided with the protruding portion protruding in the extending direction of the fitting portion. When the first connector and the second connector are fitted to each other, the protruding portion is housed in the recess formed in the housing portion of the second connector, and abuts against the recess in the direction intersecting the fitting direction. Accordingly, the relative movement of the protruding portion and the recess in the direction intersecting the fitting direction (and the relative movement of the first connector and the second connector in the direction intersecting the fitting direction, that is, the looseness) is reduced. Accordingly, it is possible to prevent deterioration of the sealing performance due to fluctuation of the pressing amount of the seal member caused by this looseness.

The distal end portion (13) may have a thickness such that the inner peripheral surface (13*a*) does not contact the seal member (7) while the first connector (1) and the second connector (2) being fitted to each other.

With this configuration, the extended distal end portion of the first connector does not come into contact with the seal member during the fitting of the first connector and the second connector. Accordingly, it is possible to more effectively reduce the positional deviation of the seal member when the connectors are fitted to each other.

What is claimed is:

1. A connector unit comprising: a first connector and a second connector configured to be fitted to each other; and a seal member configured to, when the first connector and the second connector are fitted to each other, be interposed between the first connector and the second connector, wherein the first connector includes a fitting portion extending in a first direction in which the first connector is fitted to the second connector, the fitting portion having a distal end portion in the first direction, wherein the second connector includes a fitted portion configured such that the fitting portion is fitted to the fitted portion, wherein a thickness of the fitting portion is reduced at the distal end portion with an inner peripheral surface of the distal end portion being recessed toward an outer side in a radial direction of the connector unit, wherein the fitted portion includes: an attachment portion configured such that the seal member is attached to the attachment portion; and a housing portion provided further in the first direction than the attachment portion, wherein, when the first connector and the second connector are fitted to each other, the distal end portion is accommodated in the housing portion, and the seal member performs sealing between the fitting portion and the fitted portion by being sandwiched between the attachment portion and a packing contact portion of the fitting portion, the packing contact portion being provided further in a second direction opposite to the first direction than the distal end portion, and wherein a smooth stepped portion is formed on an inner peripheral surface of a boundary portion between the distal end portion and the packing contact portion.

2. The connector unit according to claim 1, wherein the distal end portion has a thickness such that the inner peripheral surface does not contact the seal member while the first connector and the second connector being fitted to each other.

3. A connector unit comprising: a first connector and a second connector configured to be fitted to each other; and a seal member configured to, when the first connector and the second connector are fitted to each other, be interposed between the first connector and the second connector, wherein the first connector includes a fitting portion extending in a first direction in which the first connector is fitted to the second connector, the fitting portion having a distal end portion in the first direction, wherein the second connector includes a fitted portion configured such that the fitting portion is fitted to the fitted portion, wherein a thickness of the fitting portion is reduced at the distal end portion with an inner peripheral surface of the distal end portion being recessed toward an outer side, in a radial direction, of the connector unit, wherein the fitted portion includes: an attachment portion configured such that the seal member is attached to the attachment portion; and a housing portion provided further in the first direction than the attachment portion, wherein, when the first connector and the second connector are fitted to each other, the distal end portion is accommodated in the housing portion, and the seal member performs sealing between the fitting portion and the fitted portion by being sandwiched between the attachment portion and a packing contact portion of the fitting portion, the packing contact portion being provided further in a second direction opposite to the first direction than the distal end portion, wherein the distal end portion includes a protruding portion protruding in the first direction, wherein the housing portion includes a recess recessed toward the first direction, and wherein, when the first connector and the second connector are fitted to each other, the protruding portion is accommodated in the recess, and a surface of the protruding portion and an inner surface of the recess abut against each other in a direction intersecting the first and second directions.

* * * * *